United States Patent
Jin et al.

(10) Patent No.: US 10,691,454 B2
(45) Date of Patent: *Jun. 23, 2020

(54) CONFLICT MASK GENERATION

(71) Applicant: Intel Corporation, Santa Clara, CA (US)

(72) Inventors: Jun Jin, Shanghai (CN); Elmoustapha Ould-Ahmed-Vall, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/249,134

(22) Filed: Jan. 16, 2019

(65) Prior Publication Data

US 2019/0146794 A1 May 16, 2019

Related U.S. Application Data

(63) Continuation of application No. 15/301,224, filed as application No. PCT/CN2015/098655 on Dec. 24, 2015, now Pat. No. 10,185,562.

(51) Int. Cl.
| | |
|---|---|
| *G06F 9/312* | (2018.01) |
| *G06F 9/305* | (2018.01) |
| *G06F 9/30* | (2018.01) |
| *G06F 9/38* | (2018.01) |

(52) U.S. Cl.
CPC .......... *G06F 9/30043* (2013.01); *G06F 9/30* (2013.01); *G06F 9/30021* (2013.01);
(Continued)

(58) Field of Classification Search
CPC .... G06F 9/30043; G06F 9/30; G06F 9/30021; G06F 9/30098; G06F 9/3887;
(Continued)

(56) References Cited

U.S. PATENT DOCUMENTS

| | | | | |
|---|---|---|---|---|
| 5,940,625 A | * | 8/1999 | Smith ............... | G06F 9/3001 |
| | | | | 712/224 |
| 9,411,584 B2 | | 8/2016 | Hughes et al. | |

(Continued)

FOREIGN PATENT DOCUMENTS

| | | |
|---|---|---|
| CN | 102163142 A | 8/2011 |
| CN | 104919416 A | 9/2015 |
| WO | 2012/087583 A1 | 6/2012 |

OTHER PUBLICATIONS

Jianji Dong et al. "A proposal for two-input arbitrary Boolean logic gates using single semiconductor optical amplifier by picosecond pulse injection" Cambridge UK, 2009. (Year: 2009).*

(Continued)

*Primary Examiner* — Daniel H Pan
(74) *Attorney, Agent, or Firm* — Lowenstein Sandler LLP

(57) ABSTRACT

Single Instruction, Multiple Data (SIMD) technologies are described. A processor can store a first bitmap and generate a second bitmap with each cell identifying a mask bit. The mask bit is set when 1) a corresponding cell in a first bitmap is not in conflict with other elements in the first bitmap or 2) a corresponding cell is in conflict with one or more other cells in the first bitmap and is a last cell in a sequential order of the first bitmap that conflicts with the one or more other cells, wherein a position of each cell in the second bitmap maps to a same position of the corresponding cell in the first bitmap. The processor can store the second bitmap as a mask for a scatter operation to avoid lane conflicts.

18 Claims, 11 Drawing Sheets

(52) U.S. Cl.
CPC ........ *G06F 9/30098* (2013.01); *G06F 9/3834* (2013.01); *G06F 9/3887* (2013.01); *G06F 9/30018* (2013.01); *G06F 9/30029* (2013.01); *G06F 9/30032* (2013.01); *G06F 9/30036* (2013.01); *G06F 9/30094* (2013.01)

(58) Field of Classification Search
CPC ............. G06F 9/30018; G06F 9/30029; G06F 9/30032; G06F 9/30036; G06F 9/30094; G06F 9/3834
USPC .......................... 712/4, 5, 22, 223, 224, 225
See application file for complete search history.

(56) References Cited

U.S. PATENT DOCUMENTS

| | | | |
|---|---|---|---|
| 10,185,562 B2 * | 1/2019 | Jin | ............................ G06F 9/30 |
| 2005/0114632 A1 * | 5/2005 | Kottapalli | ........... G06F 9/30076 |
| | | | 712/225 |
| 2010/0229042 A1 * | 9/2010 | Goyal | ............ G01R 31/318558 |
| | | | 714/31 |
| 2011/0209127 A1 | 8/2011 | Janczak et al. | |
| 2014/0189307 A1 * | 7/2014 | Valentine | ............ G06F 9/30145 |
| | | | 712/208 |

OTHER PUBLICATIONS

International Search Report and Written Opinion on application No. PCT/CN2015/098655, dated Sep. 26, 2016.

* cited by examiner

| 210 | 218: 3 | 217: 4 | 216: 3 | 215: 3 | 214: 0 | 213: 1 | 212: 1 | 211: 0 |
|---|---|---|---|---|---|---|---|---|

| 220 | 228: 110000 | 227: 0 | 226: 10000 | 225: 0 | 224: 1 | 223: 10 | 222: 0 | 221: 0 |
|---|---|---|---|---|---|---|---|---|

| 230 | 238: 1 | 237: 1 | 236: 0 | 235: 0 | 234: 1 | 233: 1 | 232: 0 | 231: 0 |
|---|---|---|---|---|---|---|---|---|

FIG. 2

CONFLICT MASK GENERATION

RELATED APPLICATIONS

This application is a continuation application of U.S. patent application Ser. No. 15/301,224, filed Sep. 30, 2016, which is a 35 U.S.C. § 371 Application of International Application No. PCT/CN2015/098655, filed Dec. 24, 2015, the entire contents of which are incorporated herein by reference.

BACKGROUND

Single Instruction, Multiple Data (SIMD) architectures can be implemented in microprocessor systems to enable one instruction to operate on several operands in parallel. SIMD architectures take advantage of packing multiple data elements within one register or contiguous memory location. With parallel hardware execution, multiple operations are performed on separate data elements by one instruction to increase a performance of the microprocessor systems.

BRIEF DESCRIPTION OF THE DRAWINGS

Various embodiments of the present invention will be understood more fully from the detailed description given below and from the accompanying drawings of various embodiments of the invention.

FIG. 2 illustrates an SIMD instruction implementing a masking operation according to one embodiment.

DESCRIPTION OF EMBODIMENTS

Figure 1A:
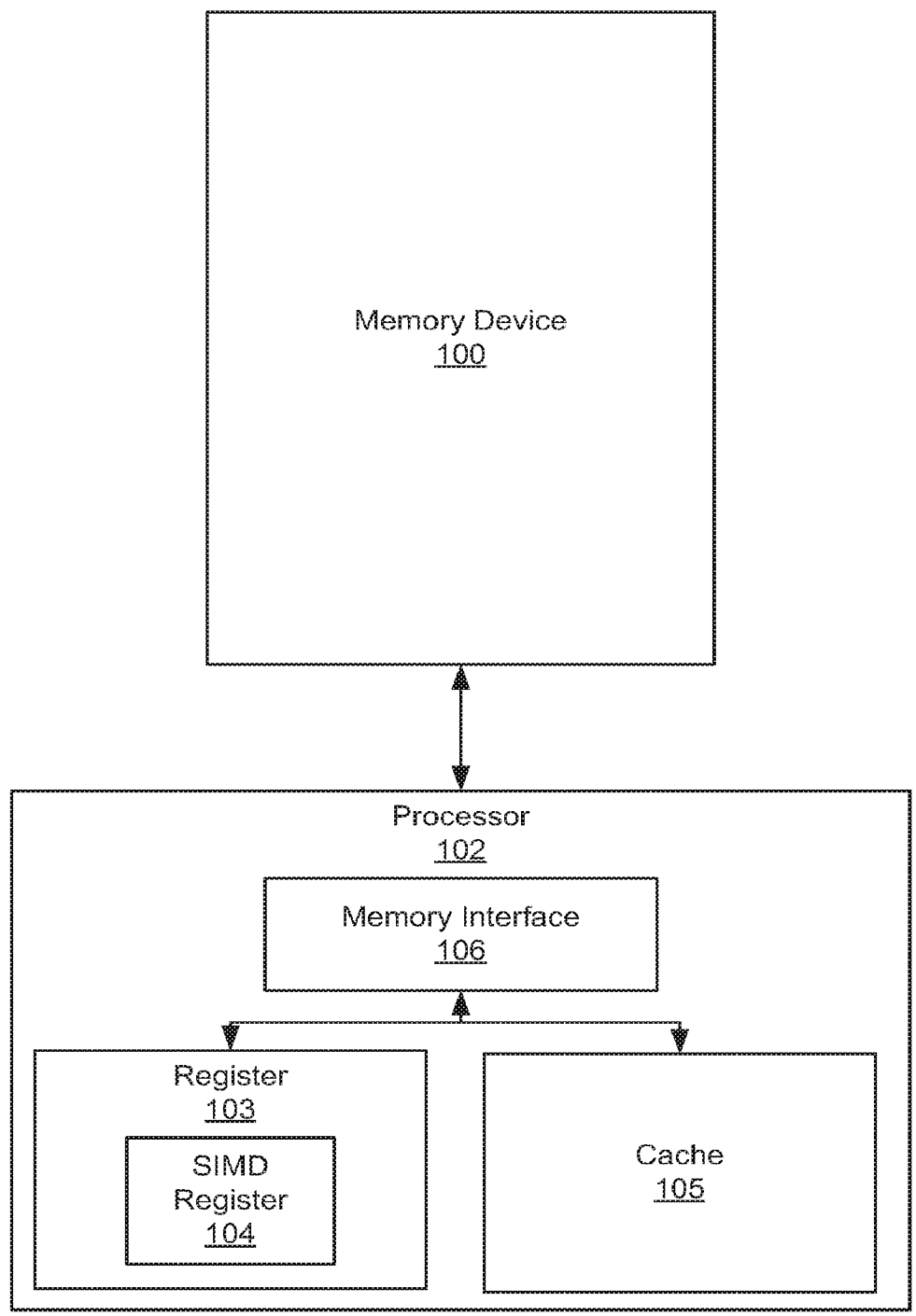
FIG. 1A illustrates a diagram of a memory device couple to a processor to perform an single instruction multiple data (SIMD) operation according to one embodiment.

Many processors use vector instruction sets or single instruction, multiple data (SIMD) instruction sets to perform multiple operations in parallel. A processor can perform multiple operations in parallel, simultaneously applying operations to the same piece of data or multiple pieces of data at the same time. Vectorization is an operation to convert a scalar program that only operates on one pair of operands at once to a vector program that can run multiple operations from a single instruction. For example, vectorization is a process of rewriting a loop operation to perform a SIMD instruction, where instead of processing a single element of an array N times, it processes M elements of the array simultaneously N/M times.

Vectorization can include an instruction (such as a sparse update instruction) to perform a gather operation, a modify operation, and a scatter operation. The gather operation and the scatter operation can indirectly access registers in a memory. For example, the gather operation uses indexed reads and the scatter operation uses indexed writes. In one example, the data elements may be at non-contiguous memory locations. The gather operation reads a set of data elements from the memory locations and aggregates the data elements into a single register or cache line. The modify operation modifies one or more of the data elements in the set of data elements. The scatter operation writes the data elements in a packed data structure to a set of non-contiguous or random memory locations.

Conventionally, processors using SIMD instruction sets have a limited performance increase because applications have irregular memory access patterns. For example, applications storing data tables that require frequent and random updates to data elements, are not be stored at contiguous memory locations and require rearrangement of the data in order to fully utilize SIMD instruction sets. The rearrangement of data causes a substantial overhead and limits an efficiency of using SIMD instruction sets.

Additionally, vectorization typically assumes that a single instruction performing the gather operation, the modify operation, and the scatter operation will access each memory location no more than once. In one example, a memory access pattern used by a union and sort algorithm (for 16 consecutive values of i) in an image search application can be vectorized as follows: gather 16 Array[a[i]]; do a SIMD computation, such as Array[a[i]]=b[i]; and scatter the new values back. When two consecutive values of a[i] are the same, then the gather operation, the modify operation, and the scatter operation for the second value of a[i] conflicts with the first value of a[i]. The conflict between the first and second values of a[i] causes a data dependency hazard. The data dependency hazard is where instructions refer to the results of preceding instructions that have not been completed yet. In one example, an SIMD instruction can have a data dependency hazard where a first operation is to add A and B to determine C and a second operation is to multiply C and D to determine E. In this example, the SIMD instruction performs the first and second operations are performed at the same time and the data dependency hazard is caused by the second operation relying on the result of the first operation. The data dependency hazard can result in unpredictable results for the SIMD instruction set. In another example, when two consecutive values of are to be written to the same memory location (e.g., memory location a[i]), the scatter operation for the second value conflicts with the scatter operation for the first value. The simultaneous writing of multiple values to the same memory location may result in unpredictable answer, e.g., a lane conflict.

The embodiments described herein address the above noted deficiencies by using a masking (VPCONFLICTMSK) operation to eliminate the data dependency hazards for the SIMD instruction sets. The VPCONFLICTMSK operation eliminates conflicting uses of data registers in a same memory location using an offset vector for the scatter operation. A write mask can be generated using the VPCONFLICTMSK operation, as discussed in greater detail in the proceeding paragraphs. The mask is used to identify values to be written by the scatter operation that are a last occurrence of a lane conflict or that are the values for the lanes with no conflict. The SIMD instruction employing the VPCONFLICTMSK operation can avoid conflict lanes causing the write dependency data hazard.

FIG. 1A illustrates a diagram of a memory device 100 couple to a processor 102 to perform an single instruction multiple data (SIMD) operation according to one embodiment. The processor 102 can include a memory interface 106, a register 103, and a cache 105. The memory interface 106 can be coupled to the register 103 and to the cache 105.

The memory interface 106 can move data between the register 103 or the cache 105 (for temporary storage) and the memory device 100 (for long term storage). In one example, the processor can use the register 103 to store data used during instructions or processes performed by the processor 102. The processor can use the memory interface 106 to write data, such as results of the instructions or the processes, to the memory device 100 for future access. In another example, the register 103 can include a SIMD register 104. The SIMD register 104 can store data used during a SIMD operation. For example, during a gather-modify-scatter operation, the processor 102 can the memory interface 106 to gather data from the memory device 100 and store the data in the SIMD register 104 to be used during a SIMD operation (the gather operation), as discussed in greater detail in the proceeding paragraphs. The processor 102 can use the data stored at the SIMD register 104 during SIMD operations (the modify operation), such as addition or multiplication operations. When the SIMD operations are completed, the processor 102 can use the memory interface 106 to write the results of the SIMD operation back to the memory device 100 (the scatter operation). In another example, the memory interface 106 can store the results of the SIMD operation in the cache 105 for other operations of the processor 102.

Figure 1B:
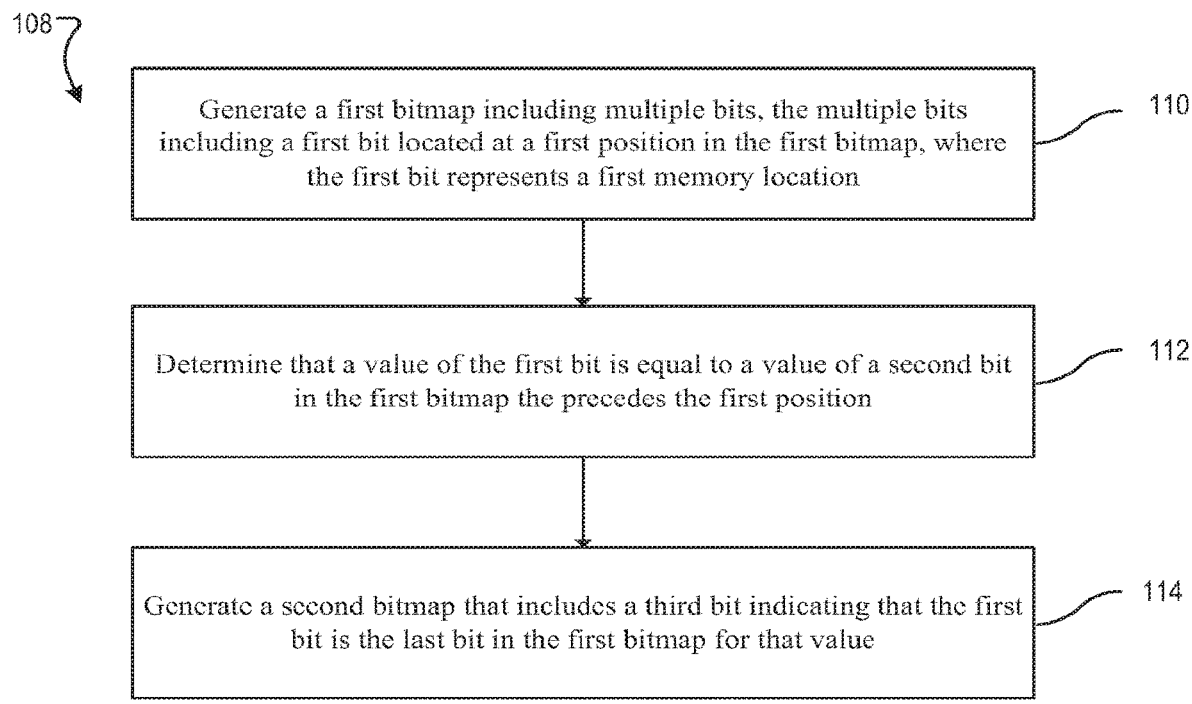
FIG. 1B illustrates a diagram for a method of writing data to a location in memory for a gather-modify-scatter operation according to one embodiment.

FIG. 1B illustrates a diagram of a method 108 for writing data to a location in memory for a gather-modify-scatter operation according to one embodiment. The method 100 may be at least partially performed by a processor 100 (FIG. 1A) or processing logic that may include hardware (e.g., circuitry, dedicated logic, programmable logic, microcode, etc.), software (e.g., instructions executed by a processing device), firmware or a combination thereof.

Referring to FIG. 1B, the method 108 begins with generating a first bitmap (110). In one embodiment, the first bitmap can include multiple bits. In another embodiment, the multiple bits can include a first bit located at a first position in the first bitmap, where the first bit represents a first memory location. The method can include determining that a value of the first bit is equal to a value of a second bit in the first bitmap, where the position of the second bit precedes the first position (112). The method can include generating a second bitmap comprising a third bit indicating that the first bit is the last bit in the first bitmap for that value (114).

Figure 1C:
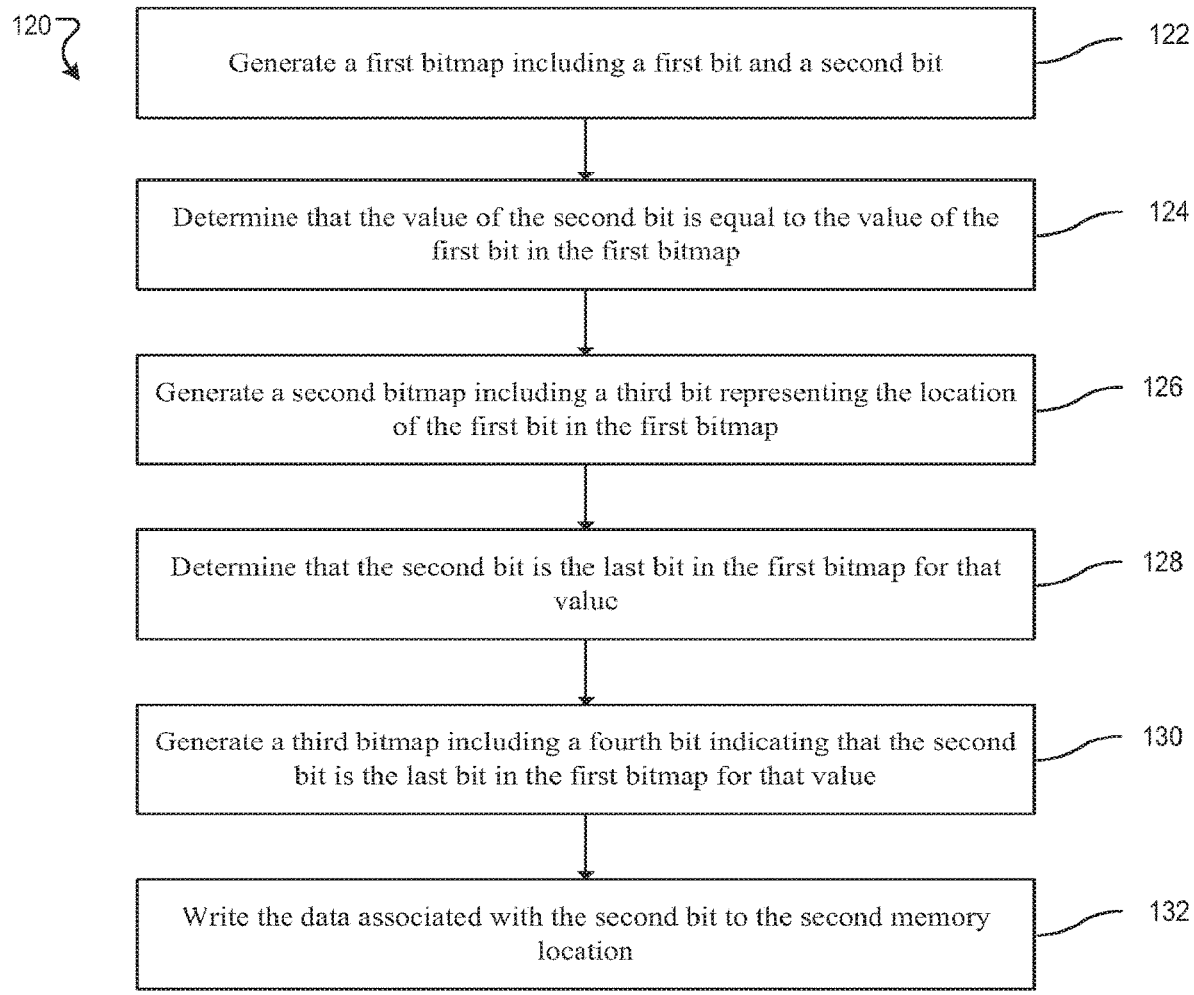
FIG. 1C illustrates another diagram for a method of writing data to a location in memory for a gather-modify-scatter operation according to one embodiment.

FIG. 1C illustrates another diagram of a method 120 for writing data to a location in memory for a gather-modify-scatter operation according to one embodiment. The method 120 may be at least partially performed by a processor 100 (FIG. 1A) or processing logic that may include hardware (e.g., circuitry, dedicated logic, programmable logic, microcode, etc.), software (e.g., instructions executed by a processing device), firmware or a combination thereof.

Referring to FIG. 1C, the method 120 begins with generating, by a processor, a first bitmap (122). In one embodiment, the first bitmap can include a first bit located at a first position in the first bitmap, where the first bit represents a first memory location. In another embodiment, the first bitmap can include a second bit located at a second position in the first bitmap, where the second bit represents a second memory location. In another embodiment, the first position and the second position of the first bitmap are in sequential order.

The method can include determining that the value of the second bit is equal to the value of the first bit in the first bitmap (124). The method can include generating a second bitmap comprising a third bit representing the location of the first bit in the first bitmap (126). The method can include determining that the second bit is the last bit in the first bitmap for that value (128). The method can include generating a third bitmap comprising a fourth bit indicating that the second bit is the last bit in the first bitmap for that value (130). The method can include writing the data associated with the second bit to the second memory location (132).

In one embodiment, the first bitmap can include a fifth bit located at a third position in the first bitmap, where the fifth bit represents a third memory location. The method 120 can include determining that the value of the fifth bit is not equal to a value of the second bit and writing the data associated with the fifth bit to the second memory location.

In another embodiment, the method can include determining that the value of the fifth bit is equal to the value of the second bit and generating the second bitmap that includes the third bit representing the location of the first bit and the fifth bit in the first bitmap. The method can also include determining that the second bit is the last bit in the first bitmap with for that value and generating a third bitmap comprising a fourth bit indicating that the second bit is the last bit in the first bitmap for that value.

In another embodiment, the first bitmap can include a fifth bit located at a third position in the first bitmap, where the fifth bit represents a third memory location, and a sixth bit located at a fourth position in the first bitmap, where the sixth bit represents a fourth memory location. In one example, the method 120 can include determining that the value of the fifth bit is equal to the value of the sixth bit in the first bitmap and generating the second bitmap that includes a seventh bit representing the location of the sixth bit in the first bitmap. The method can also include determining that the sixth bit is the last bit in the first bitmap for that value and generating a third bitmap that includes an eighth bit indicating that the sixth bit is the last bit in the first bitmap for that value. The method can include writing the data associated with the sixth bit to the fourth memory location.

In one example, the first bitmap can include: a fifth bit located at a third position in the first bitmap, where the fifth bit represents a third memory location; a sixth bit located at a fourth position in the first bitmap, where the sixth bit represents a fourth memory location; and a seventh bit located at a fifth position in the first bitmap, where the seventh bit represents a fifth memory location.

In one embodiment, the method 120 can include determining that the value of the fifth bit is equal to the value of the sixth bit in the first bitmap. The method can also include determining that the value of the seventh bit is not equal to any other bits in the first bitmap. The method can include generating a second bitmap that includes an eighth bit representing the location of the sixth bit in the first bitmap and determining that the sixth bit is the last bit in the first bitmap for that value. The method can include generating a third bitmap that includes a ninth bit indicating that the sixth bit is the last bit in the first bitmap for that value and a tenth bit indicating that no other bits in the first bitmap that are equal to the seventh bit. The method can include writing data associated with the sixth bit to the fourth memory location and writing data associated with the seventh bit to the fifth memory location.

In another embodiment, the method 120 can include determining that the value of the fifth bit is equal to the value of the seventh bit in the first bitmap and the value of the sixth bit is equal to the value of the seventh bit in the first bitmap. The method can also include generating a second bitmap that includes an eighth bit representing the location of the fifth bit and the sixth bit in the first bitmap and determining that the seventh bit is the last bit in the first bitmap for that value. The method can include generating a third bitmap that includes an ninth bit indicating that the seventh bit is the last bit in the first bitmap for that value. The method can include writing the data associated with the seventh bit to the fifth memory location.

FIG. 2 illustrates an SIMD instruction implementing a masking operation according to one embodiment. The SIMD instruction is an example of an implementation of the method described in FIG. 1A or 1B. In one example, the SIMD instruction can operate on a memory register with 8 memory locations. The SIMD instruction can include bitmap generation operation to generate a bitmap, where the bitmap includes a bit vector that indicates which cells have conflicting memory locations.

Row 210 is an array of cells 211-218 that store values indicating locations in a memory (e.g., memory locations). The value in cell 211 represents location 0 in the memory, the value in cell 212 represents location 1 in the memory, the value in cell 213 represents location 1 in the memory, the value in cell 214 represents location 0 in the memory, the value in cell 215 represents location 3 in the memory, the value in cell 216 represents location 3 in the memory, the value in cell 216 represents location 3 in the memory, the value in cell 217 represents location 4 in the memory, and the value in cell 218 represents location 3 in the memory. Cells with the same memory location designations conflict with each other. For example, cell 211 conflicts with cell 214. Cell 212 conflicts with cell 213. Cell 215, cell 216, and cell 218 conflict with each other. Cell 217 does not conflict with any other cell in row 210.

When the bitmap generation operation has generated a bit vector that indicates which cells have conflicting memory locations, a conflicts operation (VPCONFLICT) can be performed to output a string of bit values that indicates when one or more memory locations associated with a cell preceding a current cell conflicts with the memory location associated with the current cell. For example, a processor can perform the VPCONFLICT operation, where the VPCONFLICT operation can use a first vector (such as a register location in cache or a memory location) as a source and write the results of comparisons of each element of the source with the preceding elements to a vector destination. Each element in the vector destination contains a range of bits corresponding to the comparison of the current element in the source with the preceding elements and each bit in the vector destination is set when the corresponding comparison shows a conflict. A memory location conflicts when a memory location of the current cell is the same as a memory location of the preceding cell. In another example, a processor can perform the VPCONFLICT operation to determine when a memory location of the current cell conflicts with a memory location of a preceding cell by comparing a memory location associated with the current cell to a memory location associated with the preceding cell.

Each bit in the string is set when the corresponding comparison of a memory location associated with a current cell shows a conflict with a memory location associated with a previous cell. For example, the values in cells 221-228 of row 220 are strings of bit values. In one embodiment, each bit value in the string indicates when one or more memory locations associated with a cell preceding the current cell conflicts with the memory location associated with the current cell. In one embodiment, the bit values equal to 1s indicate cells storing memory locations that conflict with the memory location associated with the current cell. In another embodiment, 0s indicate cells storing memory locations that do not conflict with the memory location associated with the current cell. In another embodiment, a location of each bit value in a string of bit values of a cell indicates a location of the conflicting cell in the array 210.

For example, cell 221 correlates to cell 211 and indicates whether any cells preceding cell 211 conflict with cell 211. Where cell 211 is the first cell in the array 210, no cells precede cell 211 so there are no conflicting cells that precede cell 211. In one embodiment, the bit string value in cell 221 is 0. In another embodiment, the bit string value in cell 221 is blank.

Cell 222 correlates to cell 212 and indicates whether any cells preceding cell 212 conflict with cell 212. Cell 211 designates location 0 in the memory and cell 212 designates location 1 in memory. The preceding cell 211 does not conflict with the current cell 212 (e.g., a bit value of 0). Accordingly, the bit string value in cell 222 is 0.

Cell 223 correlates to cell 213 and indicates whether any cells preceding cell 213 conflict with cell 213. Cell 211 designates location 0 in the memory, cell 212 designates location 1 in memory, and cell 213 designates location 1 in the memory. The preceding cell 212 conflicts the current cell 213 (e.g., a bit value of 1) and the preceding cell 211 does not conflict with the current cell 213 (e.g., a bit value of 0). Accordingly, the bit string value in cell 223 is 10.

Cell 224 correlates to cell 214 and indicates whether any cells preceding cell 214 conflict with cell 214. Cell 211 designates location 0 in the memory, cell 212 designates location 1 in memory, cell 213 designates location 1 in the memory, and cell 214 designates location 0 in the memory. The preceding cell 213 does not conflicts the current cell 214 (e.g., a bit value of 0), cell 212 does not conflict with the current cell 214 (e.g., a bit value of 0), and cell 211 conflicts with the current cell 214 (e.g., a bit value of 1). Accordingly, the bit string value in cell 224 is 001.

Cell 225 correlates to cell 215 and indicates whether any cells preceding cell 215 conflict with cell 215. Cell 211 designates location 0 in the memory, cell 212 designates location 1 in memory, cell 213 designates location 1 in the memory, cell 214 designates location 0 in the memory, and cell 215 designates location 3 in the memory. The preceding cell 214 does not conflicts the current cell 215 (e.g., a bit value of 0), cell 213 does not conflict with the current cell 215 (e.g., a bit value of 0), cell 212 does not conflict with the current cell 215 (e.g., a bit value of 0), and cell 211 does not conflict with the current cell 215 (e.g., a bit value of 0). Accordingly, the bit string value in cell 225 is 0000.

Cell 226 correlates to cell 216 and indicates whether any cells preceding cell 216 conflict with cell 216. Cell 211 designates location 0 in the memory, cell 212 designates location 1 in memory, cell 213 designates location 1 in the memory, cell 214 designates location 0 in the memory, cell 215 designates location 3 in the memory, and cell 216 designates location 3 in the memory. The preceding cell 215 conflicts the current cell 216 (e.g., a bit value of 1), cell 214 does not conflict with the current cell 216 (e.g., a bit value of 0), cell 213 does not conflict with the current cell 216 (e.g., a bit value of 0), cell 212 does not conflict with the current cell 216 (e.g., a bit value of 0), and cell 211 does not conflict with the current cell 216. Accordingly, the bit string value in cell 226 is 10000.

Cell 227 correlates to cell 217 and indicates whether any cells preceding cell 217 conflict with cell 217. Cell 211 designates location 0 in the memory, cell 212 designates location 1 in memory, cell 213 designates location 1 in the memory, cell 214 designates location 0 in the memory, cell 215 designates location 3 in the memory, cell 216 designates location 3 in the memory, and cell 217 designates location 4 in the memory. The preceding cell 216 does not conflicts the current cell 217 (e.g., a bit value of 0), cell 215 does not conflict with the current cell 217 (e.g., a bit value of 0), cell 214 does not conflict with the current cell 217 (e.g., a bit value of 0), cell 213 does not conflict with the current cell 217 (e.g., a bit value of 0), cell 212 does not conflict with the current cell 217, and cell 211 does not conflict with the current cell 217. Accordingly, the bit string value in cell 227 is 00000.

Cell 228 correlates to cell 218 and indicates whether any cells preceding cell 218 conflict with cell 218. Cell 211 designates location 0 in the memory, cell 212 designates location 1 in memory, cell 213 designates location 1 in the memory, cell 214 designates location 0 in the memory, cell 215 designates location 3 in the memory, cell 216 designates location 3 in the memory, cell 217 designates location 4 in the memory, and cell 218 designates location 3 in the memory. The preceding cell 217 does not conflicts the current cell 218 (e.g., a bit value of 0), cell 216 conflicts with the current cell 218 (e.g., a bit value of 1), cell 215 conflicts with the current cell 218 (e.g., a bit value of 1), cell 214 does not conflict with the current cell 218 (e.g., a bit value of 0), cell 213 does not conflict with the current cell 218 (e.g., a bit value of 0), cell 212 does not conflict with the current cell 218 (e.g., a bit value of 0), and cell 211 does not conflict with the current cell 218 (e.g., a bit value of 0). Accordingly, the bit string value in cell 228 is 0110000.

When the string of bits has been generated for each cell 221-228, a VPCONFLICT operation can be performed to generate masks to indicate the cells storing values to write to memory in a scatter operation. In one embodiment, a bit value of 1 designates that a value stored in a corresponding cell 211-218 is to be written memory and a bit value of 0 designates that a value stored in a corresponding cell 211-218 is not to be written memory.

In one example, the values in cells 221-228 of row 220 store strings of bit values. In one embodiment, each bit value in a cell indicates which cells 211-218 of row 210 contain the last memory location. In one embodiment, the cells with no conflicts and the lasts cells for conflicting memory locations have a masking bit set from them indicating to write the value in the associated cells 211-218 of row 210. In one embodiment, a 0 bit designates that a cell does not store the last value for a memory location and a 1 bit designates that a cell store the last value for a memory location. For example, cell 231 includes a bit value of 0 designating that cell 211 does not store a last sequential value for memory location 0. Cell 232 includes a bit value of 0 designating that cell 242 does not store a last sequential value for memory location 1. Cell 233 includes a bit value of 1 designating that cell 243 stores a last sequential value for memory location 1, e.g., the last value of the memory locations for the cells 211-218 for memory location 1. Cell 234 includes a bit value of 1 designating that cell 234 stores a last sequential value for memory location 0, e.g., the last value of the memory locations for the cells 211-218 that are for memory location 0. Cell 235 includes a bit value of 0 designating that cell 215 does not store a last value for memory location 3. Cell 236 includes a bit value of 0 designating that cell 216 does not store a last value for memory location 3. Cell 237 includes a bit value of 1 designating that cell 217 stores a last sequential value for memory location 4, e.g., the last value of the memory locations for the cells 211-218 that are for memory location 4. Cell 238 includes a bit value of 1 designating that cell 218 stores a last sequential value for memory location 3, e.g., the last value of the memory locations for the cells 211-218 that are for memory location 3.

The following pseudo-code illustrates an example VPCONFLICTMSK instruction.

```
VPCONFLICTMSK
(KL, VL) = (4, 128), (8, 256), (16, 512)
For j ← 0 TO KL-1
    i ← j *32
    IF MaskBit(j) OR *no writemask*
        THEN
            IF SRC[KL-1:0] == 0 THEN DEST[j] == 1
                ELSE
                    FOR k ← 0 TO j
                        IF SRC[i+k] != 0 AND f[k] == 0
                        THEN
                            DEST[j] ← 1
                            f[k] ← 1;
                    ENDFOR
        ELSE
            IF *merging masking*
                THEN *DEST[j] remains unchanged*
                ELSE DEST[j] ← 0
            FI
ENDFOR
```

The KL can be the length or number of bits indicating that the a bit is the last bit in the a bitmap for a value or that the bit does not conflict with other bits. VL can be a vector length, such as a length of an array. For example a VL that is equal to 128 is for an array length of 4 and a VL that is equal to 256 is for an array length of 8. The i can be a designator for a current cell in the array. The MaskBit(j) OR *no writemask* indicates whether the masking bit is for a write mask or a no-write mask, as discussed in greater detail in the proceeding paragraphs.

The software program can perform the scatter operation to write to memory the values in cells 211-218 that are associated with the cells 231-238 that store masking bits with a value of 1. For example, cell 231 has a masking bit with a value of 0, so the value stored at cell 211 is not written to memory location 0. Cell 232 has a masking bit with a value of 0, so the value stored at cell 212 is not written to memory location 1. Cell 233 has a masking bit with a value of 1, so the value stored at cell 213 is written to memory location 1. Cell 234 has a masking bit with a value of 1, so the value stored at cell 214 is written to memory location 0. Cell 235 has a masking bit with a value of 0, so the value stored at cell 215 is not written to memory location 3. Cell 236 has a masking bit with a value of 0, so the value stored at cell 216 is not written to memory location 3. Cell 237 has a masking bit with a value of 1, so the value stored at cell 216 is written to memory location 4. Cell 238 has a masking bit with a value of 1, so the value stored at cell 217 is written to memory location 3.

Figure 3A:
FIG. 3A is a block diagram illustrating an in-order pipeline and a register renaming stage, out-of-order issue/execution pipeline according to one embodiment.

FIG. 3A is a block diagram illustrating is a block diagram illustrating an in-order pipeline and a register renaming stage, out-of-order issue/execution pipeline implemented by processor 300 according to some embodiments of the disclosure. The solid lined boxes in FIG. 3A illustrate an in-order pipeline, while the dashed lined boxes illustrates a register renaming, out-of-order issue/execution pipeline. Specifically, processor 300 depicts an in-order architecture core and a register renaming logic, out-of-order issue/execution logic to be included in a processor according to at least one embodiment of the disclosure.

In FIG. 3A, the pipeline includes a fetch stage 302, a length decode stage 304, a decode stage 306, an allocation stage 308, a renaming stage 310, a scheduling (also known as a dispatch or issue) stage 312, a register read/memory read stage 314, an execute stage 316, a write back/memory write stage 318, an exception handling stage 322, and a commit stage 324. In some embodiments, the ordering of stages 302-324 may be different than illustrated and are not limited to the specific ordering shown in FIG. 3A.

Figure 3B:
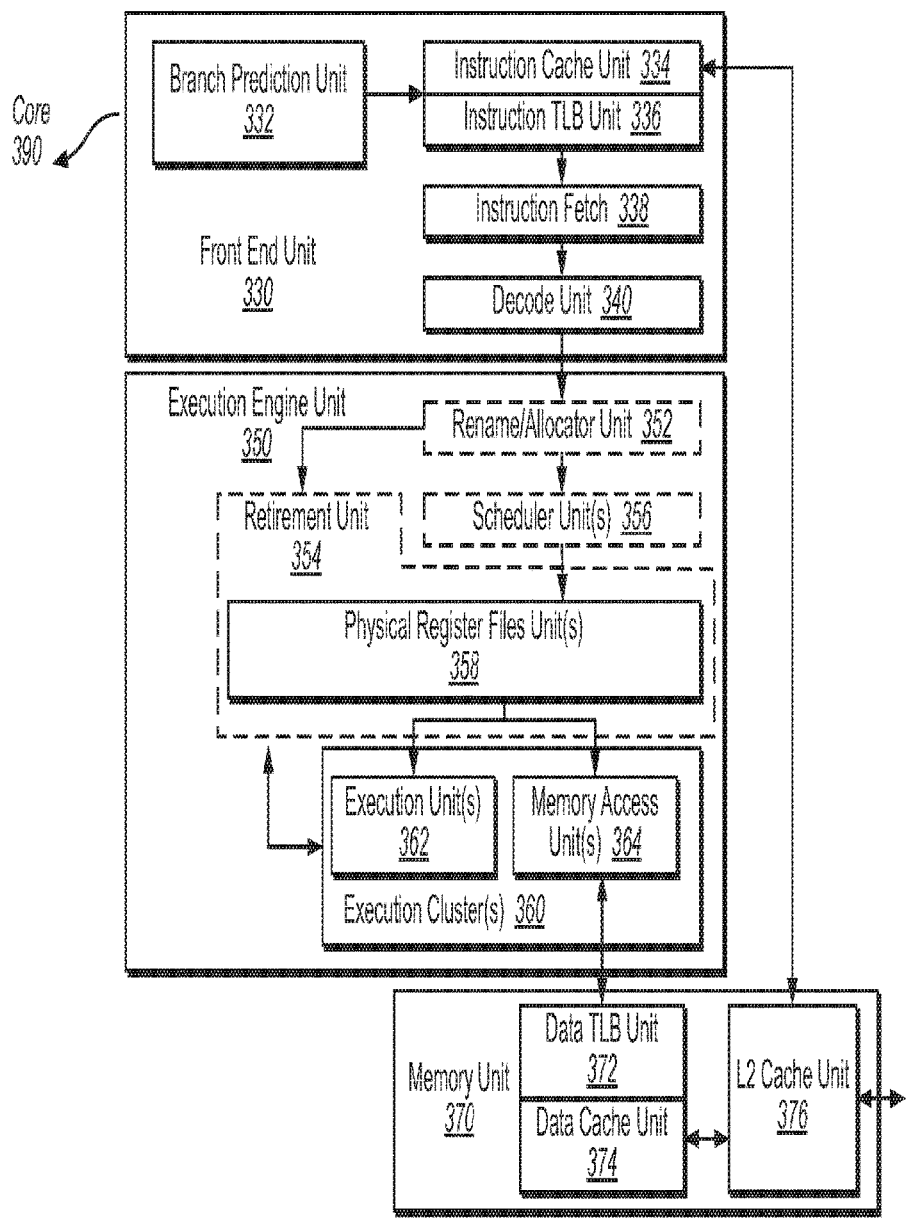
FIG. 3B is a block diagram illustrating a micro-architecture for a processor that implements secure memory repartitioning according to one embodiment.

FIG. 3B is a block diagram illustrating a micro-architecture for a processor 300 that implements dynamic cache hash changes between SNCs according to one embodiment. Processor 300 includes a front end unit 330 coupled to an execution engine unit 350, and both are coupled to a memory unit 370. The processor 300 may include a reduced instruction set computing (RISC) core, a complex instruction set computing (CISC) core, a very long instruction word (VLIW) core, or a hybrid or alternative core type. As yet another option, processor 300 may include a special-purpose core, such as, for example, a network or communication core, compression engine, graphics core, or the like. In one embodiment, processor 300 may be a multi-core processor or may be part of a multi-processor system. The embodiments of the page additions and content copying can be implemented in processor 300.

The front end unit 330 includes a branch prediction unit 332 coupled to an instruction cache unit 334, which is coupled to an instruction translation lookaside buffer (TLB) 336, which is coupled to an instruction fetch unit 338, which is coupled to a decode unit 340. The decode unit 340 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 340 may be implemented using various different mechanisms. Examples of suitable mechanisms include, but are not limited to, look-up tables, hardware implementations, programmable logic arrays (PLAs), microcode read only memories (ROMs), etc. The instruction cache unit 334 is further coupled to the memory unit 370. The decode unit 340 is coupled to a rename/allocator unit 352 in the execution engine unit 350.

The execution engine unit 350 includes the rename/allocator unit 352 coupled to a retirement unit 354 and a set of one or more scheduler unit(s) 356. The scheduler unit(s) 356 represents any number of different schedulers, including reservations stations (RS), central instruction window, etc. The scheduler unit(s) 356 is coupled to the physical register file(s) unit(s) 358. Each of the physical register file(s) units 358 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 358 is overlapped by the retirement unit 354 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 354 and the physical register file(s) unit(s) 358 are coupled to the execution cluster(s) 360. The execution cluster(s) 360 includes a set of one or more execution units 362 and a set of one or more memory access units 364. The execution units 362 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 356, physical register file(s) unit(s) 358, and execution cluster(s) 360 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 364). It should also be understood that where separate pipelines are used, one or more of these pipelines may be out-of-order issue/execution and the rest in-order.

The set of memory access units 364 is coupled to the memory unit 370, which may include a data prefetcher 380, a data TLB unit 372, a data cache unit (DCU) 374, and a level 2 (L2) cache unit 376, to name a few examples. In some embodiments DCU 374 is also known as a first level data cache (L1 cache). The DCU 374 may handle multiple outstanding cache misses and continue to service incoming stores and loads. It also supports maintaining cache coherency. The data TLB unit 372 is a cache used to improve virtual address translation speed by mapping virtual and physical address spaces. In one exemplary embodiment, the memory access units 364 may include a load unit, a store address unit, and a store data unit, each of which is coupled to the data TLB unit 372 in the memory unit 370. The L2 cache unit 376 may be coupled to one or more other levels of cache and eventually to a main memory.

In one embodiment, the data prefetcher 380 speculatively loads/prefetches data to the DCU 374 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 300 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 4:
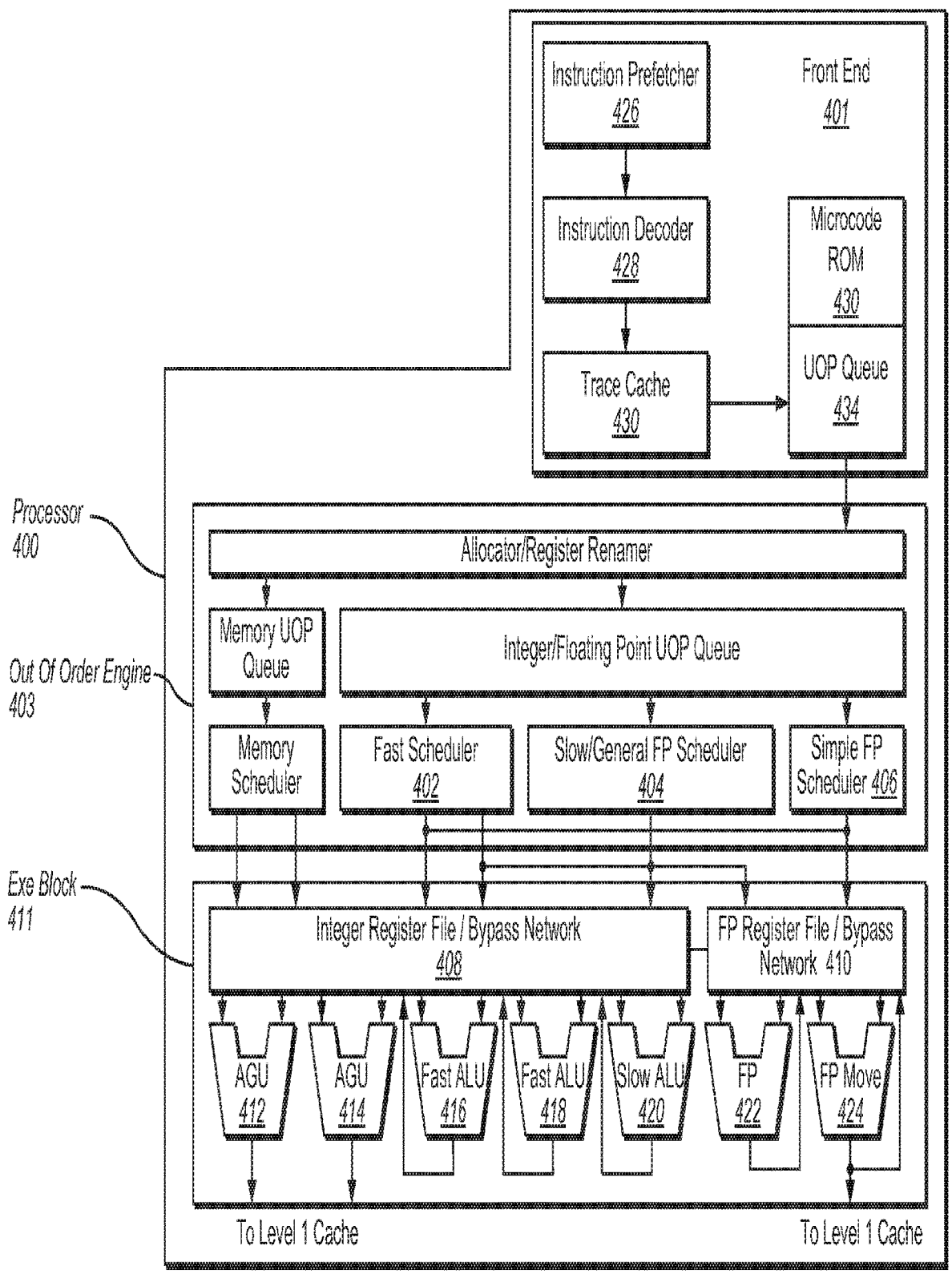
FIG. 4 illustrates a block diagram of the micro-architecture for a processor that includes logic circuits to perform secure memory repartitioning according to one embodiment.

FIG. 4 illustrates a block diagram of the micro-architecture for a processor 400 that includes logic circuits to perform dynamic cache hash changes between SNCs according to one embodiment. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 401 is the part of the processor 400 that fetches instructions to be executed and prepares them to be used later in the processor pipeline. The embodiments of the page additions and content copying can be implemented in processor 400.

The front end 401 may include several units. In one embodiment, the instruction prefetcher 416 fetches instructions from memory and feeds them to an instruction decoder 418 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 430 takes decoded uops and assembles them into program ordered sequences or traces in the uop queue 434 for execution. When the trace cache 430 encounters a complex instruction, the microcode ROM 432 provides the uops needed to complete the operation.

Some instructions are converted into a single micro-op, whereas others need several micro-ops to complete the full operation. In one embodiment, if more than four micro-ops are needed to complete an instruction, the decoder 418 accesses the microcode ROM 432 to do the instruction. For one embodiment, an instruction can be decoded into a small number of micro ops for processing at the instruction decoder 418. In another embodiment, an instruction can be stored within the microcode ROM 432 should a number of micro-ops be needed to accomplish the operation. The trace cache 430 refers to an entry point programmable logic array (PLA) to determine a correct micro-instruction pointer for reading the micro-code sequences to complete one or more instructions in accordance with one embodiment from the micro-code ROM 432. After the microcode ROM 432 finishes sequencing micro-ops for an instruction, the front end 401 of the machine resumes fetching micro-ops from the trace cache 430.

The out-of-order execution engine 403 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 402, slow/general floating point scheduler 404, and simple floating point scheduler 406. The uop schedulers 402, 404, 406, determine when a uop is ready to execute based on the readiness of their dependent input register operand sources and the availability of the execution resources the uops need to complete their operation. The fast scheduler 402 of one embodiment can schedule on each half of the main clock cycle while the other schedulers can only schedule once per main processor clock cycle. The schedulers arbitrate for the dispatch ports to schedule uops for execution.

Register files 408, 410, sit between the schedulers 402, 404, 406, and the execution units 412, 414, 416, 418, 420, 422, 424 in the execution block 411. There is a separate register file 408, 410, for integer and floating point operations, respectively. Each register file 408, 410, of one embodiment also includes a bypass network that can bypass or forward just completed results that have not yet been written into the register file to new dependent uops. The integer register file 408 and the floating point register file 410 are also capable of communicating data with the other. For one embodiment, the integer register file 408 is split into two separate register files, one register file for the low order 32 bits of data and a second register file for the high order 32 bits of data. The floating point register file 410 of one embodiment has 128 bit wide entries because floating point instructions typically have operands from 64 to 128 bits in width.

The execution block 411 contains the execution units 412, 414, 416, 418, 420, 422, 424, where the instructions are actually executed. This section includes the register files 408, 410, that store the integer and floating point data operand values that the micro-instructions need to execute. The processor 400 of one embodiment is comprised of a number of execution units: address generation unit (AGU) 412, AGU 414, fast ALU 416, fast ALU 418, slow ALU 420, floating point ALU 422, floating point move unit 424. For one embodiment, the floating point execution blocks 412, 414, execute floating point, MMX, SIMD, and SSE, or other operations. The floating point ALU 412 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 416, 418. The fast ALUs 416, 418, of one embodiment can execute fast operations with an effective latency of half a clock cycle. For one embodiment, most complex integer operations go to the slow ALU 410 as the slow ALU 410 includes integer execution hardware for long latency type of operations, such as a multiplier, shifts, flag logic, and branch processing. Memory load/store operations are executed by the AGUs 412, 414. For one embodiment, the integer ALUs 416, 418, 420, are described in the context of performing integer operations on 64 bit data operands. In alternative embodiments, the ALUs 416, 418, 420, can be implemented to support a variety of data bits including 16, 32, 128, 256, etc. Similarly, the floating point units 412, 414, can be implemented to support a range of operands having bits of various widths. For one embodiment, the floating point units 412, 414, can operate on 128 bits wide packed data operands in conjunction with SIMD and multimedia instructions.

In one embodiment, the uops schedulers 402, 404, 406, dispatch dependent operations before the parent load has finished executing. As uops are speculatively scheduled and executed in processor 400, the processor 400 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 400 also includes logic to implement dynamic cache hash changes between SNCs according to one embodiment. In one embodiment, the execution block 411 of processor 400 may include a microcontroller (MCU), to perform dynamic cache hash changes between SNCs according to the description herein.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 5:
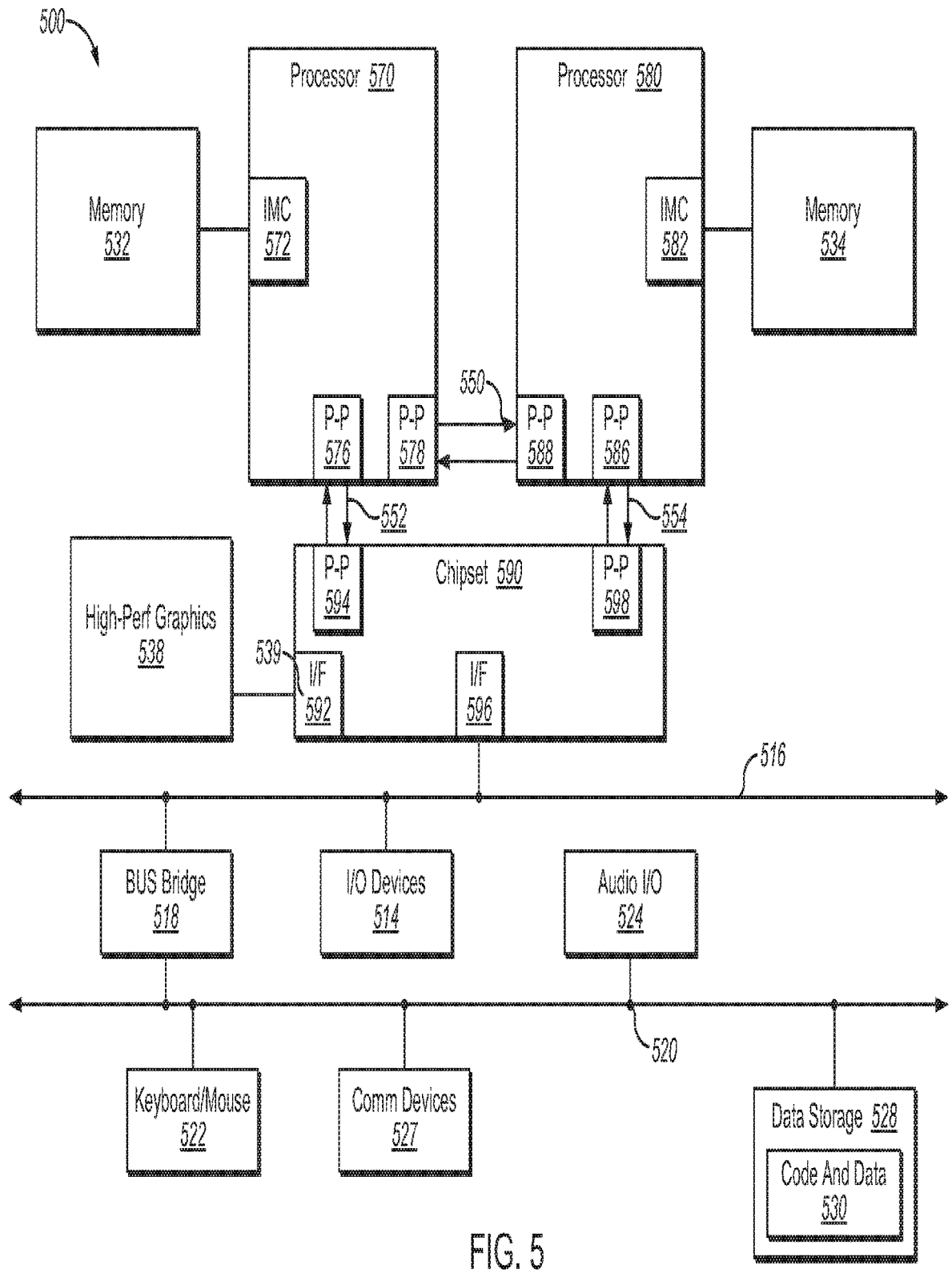
FIG. 5 is a block diagram of a computer system according to one implementation.

Embodiments may be implemented in many different system types. Referring now to FIG. 5, shown is a block diagram of a multiprocessor system 500 in accordance with an implementation. As shown in FIG. 5, multiprocessor system 500 is a point-to-point interconnect system, and includes a first processor 570 and a second processor 580 coupled via a point-to-point interconnect 550. As shown in FIG. 5, each of processors 570 and 580 may be multicore processors, including first and second processor cores (i.e., processor cores 574a and 574b and processor cores 584a and 584b), although potentially many more cores may be present in the processors. The processors each may include hybrid write mode logics in accordance with an embodiment of the present. The embodiments of the page additions and content copying can be implemented in the processor 570, processor 580, or both.

While shown with two processors 570, 580, it is to be understood that the scope of the present disclosure is not so limited. In other implementations, one or more additional processors may be present in a given processor.

Processors 570 and 580 are shown including integrated memory controller units 572 and 582, respectively. Processor 570 also includes as part of its bus controller units point-to-point (P-P) interfaces 576 and 588; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may also exchange information with a high-performance graphics circuit 538 via a high-performance graphics interface 539.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another third generation I/O interconnect bus, although the scope of the present disclosure is not so limited.

As shown in FIG. 5, various I/O devices 514 may be coupled to first bus 516, along with a bus bridge 518 which couples first bus 516 to a second bus 520. In one embodiment, second bus 520 may be a low pin count (LPC) bus. Various devices may be coupled to second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to second bus 520. Note that other architectures are possible. For example, instead of the point-to-point architecture of FIG. 5, a system may implement a multi-drop bus or other such architecture.

Figure 6:
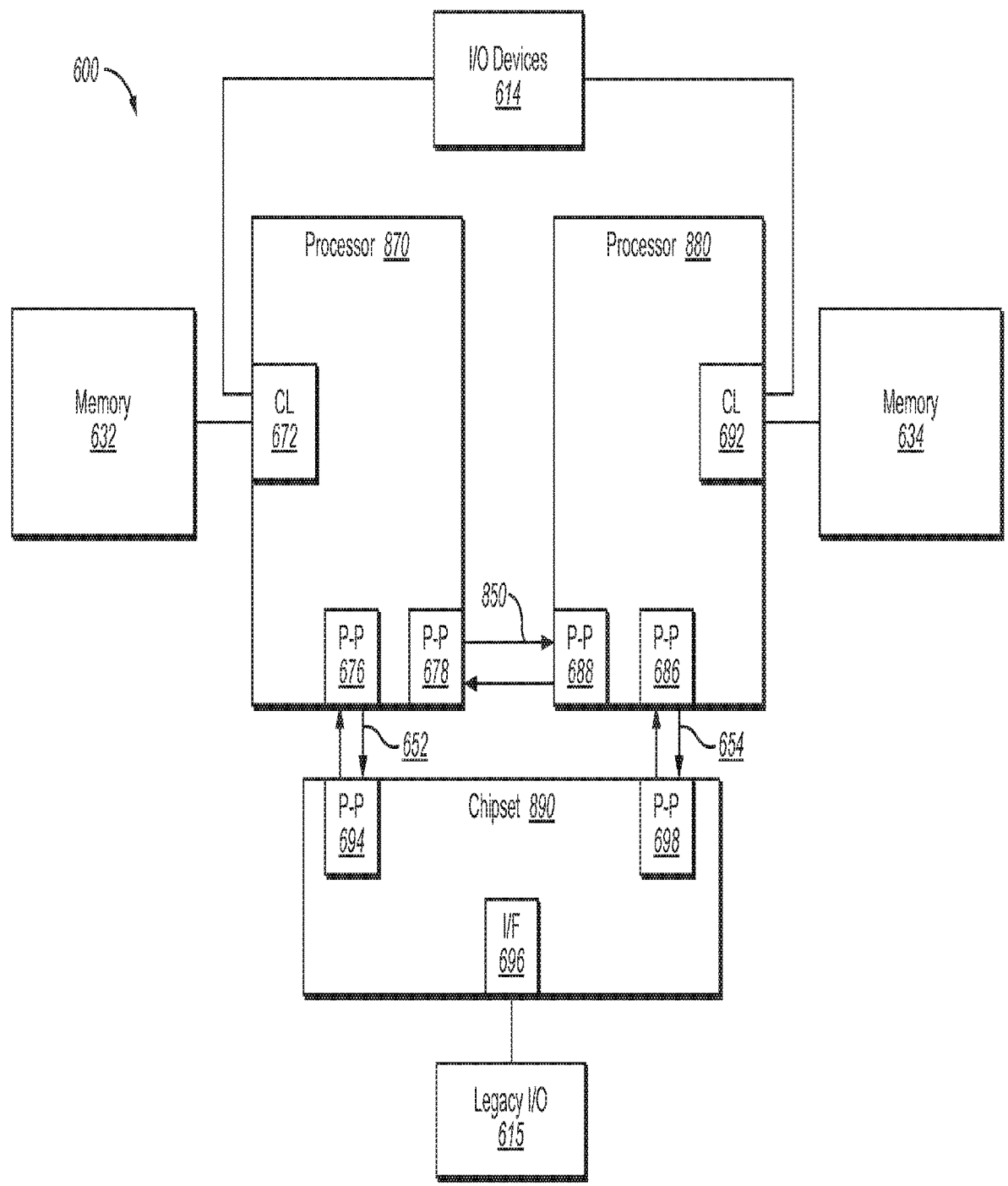
FIG. 6 is a block diagram of a computer system according to another implementation.

Referring now to FIG. 6, shown is a block diagram of a third system 600 in accordance with an embodiment of the present invention. Like elements in FIGS. 5 and 6 bear like reference numerals, and certain aspects of FIG. 5 have been omitted from FIG. 5 in order to avoid obscuring other aspects of FIG. 6.

FIG. 6 illustrates that the processors 670, 680 may include integrated memory and I/O control logic ("CL") 672 and 682, respectively. For at least one embodiment, the CL 672, 682 may include integrated memory controller units such as described herein. In addition. CL 672, 682 may also include I/O control logic. FIG. 6 illustrates that the memories 632, 634 are coupled to the CL 672, 682, and that I/O devices 614 are also coupled to the control logic 672, 682. Legacy I/O devices 615 are coupled to the chipset 690. The embodiments of the page additions and content copying can be implemented in processor 670, processor 680, or both.

Figure 7:
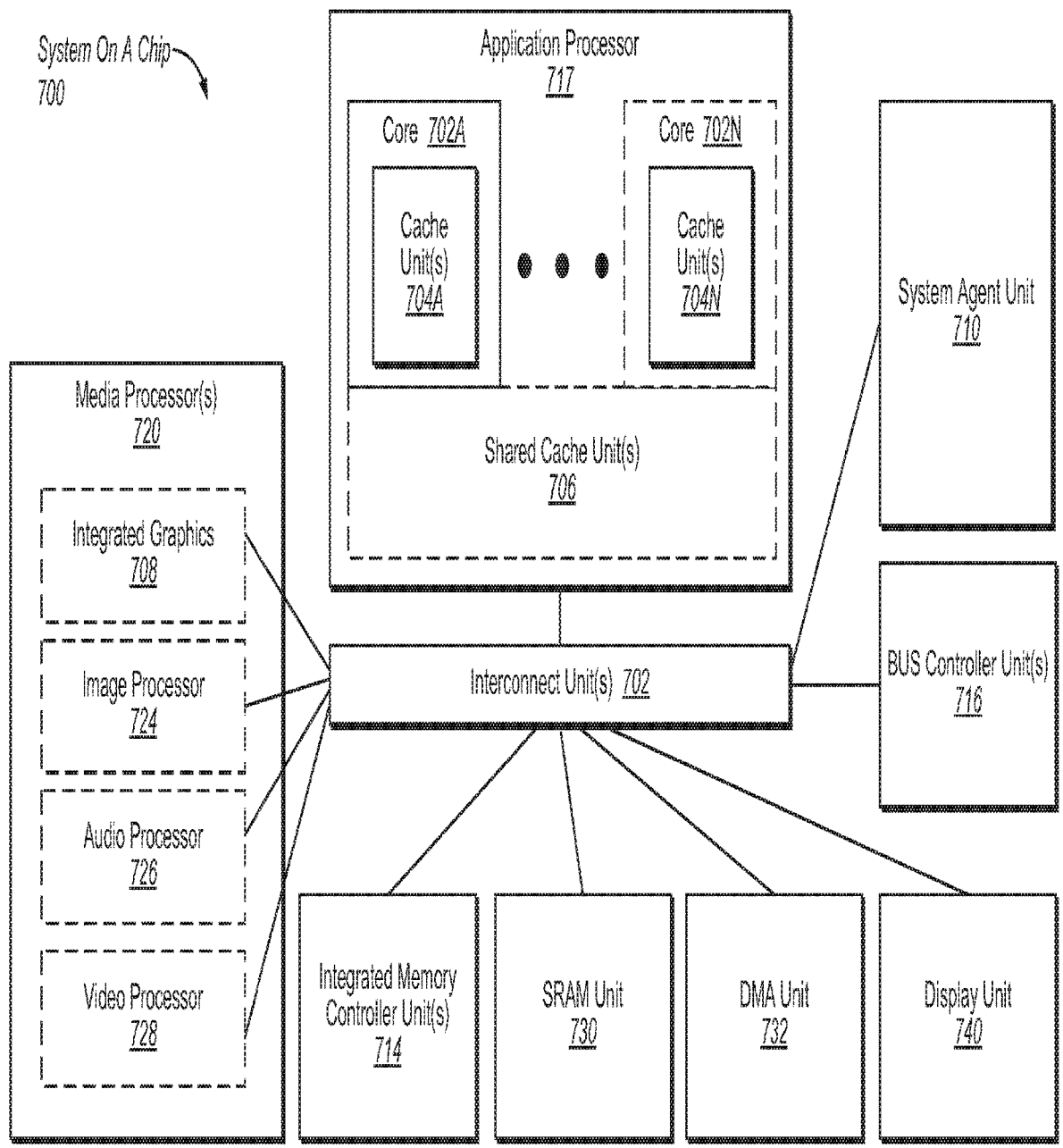
FIG. 7 is a block diagram of a system-on-a-chip according to one implementation.

FIG. 7 is an exemplary system on a chip (SoC) 700 that may include one or more of the cores 702. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 7 is a block diagram of a SoC 700 in accordance with an embodiment of the present disclosure. Dashed lined boxes are features on more advanced SoCs. In FIG. 7 an interconnect unit(s) 702 is coupled to: an application processor 717 which includes a set of one or more cores 702A-N and shared cache unit(s) 706; a system agent unit 710; a bus controller unit(s) 716; an integrated memory controller unit(s) 714; a set or one or more media processors 720 which may include integrated graphics logic 708, an image processor 724 for providing still and/or video camera functionality, an audio processor 726 for providing hardware audio acceleration, and a video processor 728 for providing video encode/decode acceleration; a static random access memory (SRAM) unit 730; a direct memory access (DMA) unit 732; and a display unit 740 for coupling to one or more external displays. The embodiments of the pages additions and content copying can be implemented in SoC 700.

Figure 8:
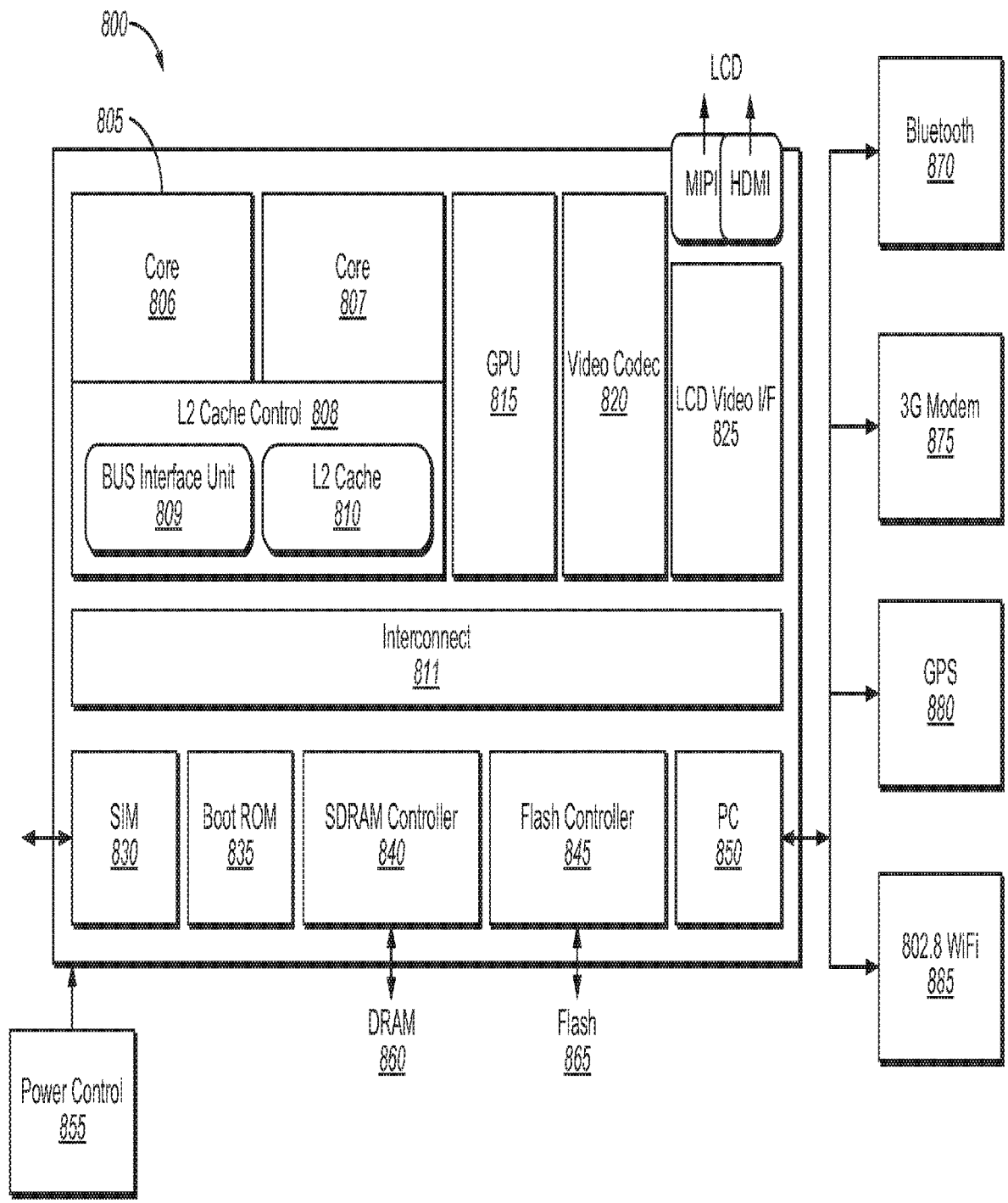
FIG. 8 illustrates another implementation of a block diagram for a computing system according to one implementation.

Turning next to FIG. 8, an embodiment of a system on-chip (SoC) design in accordance with embodiments of the disclosure is depicted. As an illustrative example, SoC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 800.

Here, SoC 800 includes 2 cores—806 and 807. Similar to the discussion above, cores 806 and 807 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 811 includes an on-chip interconnect, such as an IOSF, AMBA, or other interconnects discussed above, which can implement one or more aspects of the described disclosure.

Interconnect 811 provides communication channels to the other components, such as a Subscriber Identity Module (SIM) 830 to interface with a SIM card, a boot ROM 835 to hold boot code for execution by cores 806 and 807 to initialize and boot SoC 800, a SDRAM controller 840 to interface with external memory (e.g. DRAM 860), a flash controller 845 to interface with non-volatile memory (e.g. Flash 865), a peripheral control 850 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the embodiments described herein.

In addition, the system illustrates peripherals for communication, such as a Bluetooth module 870, 3G modem 875, GPS 880, and Wi-Fi 885. Note as stated above, a UE includes a radio for communication. As a result, these peripheral communication modules may not all be included. However, in a UE some form of a radio for external communication should be included.

Figure 9:
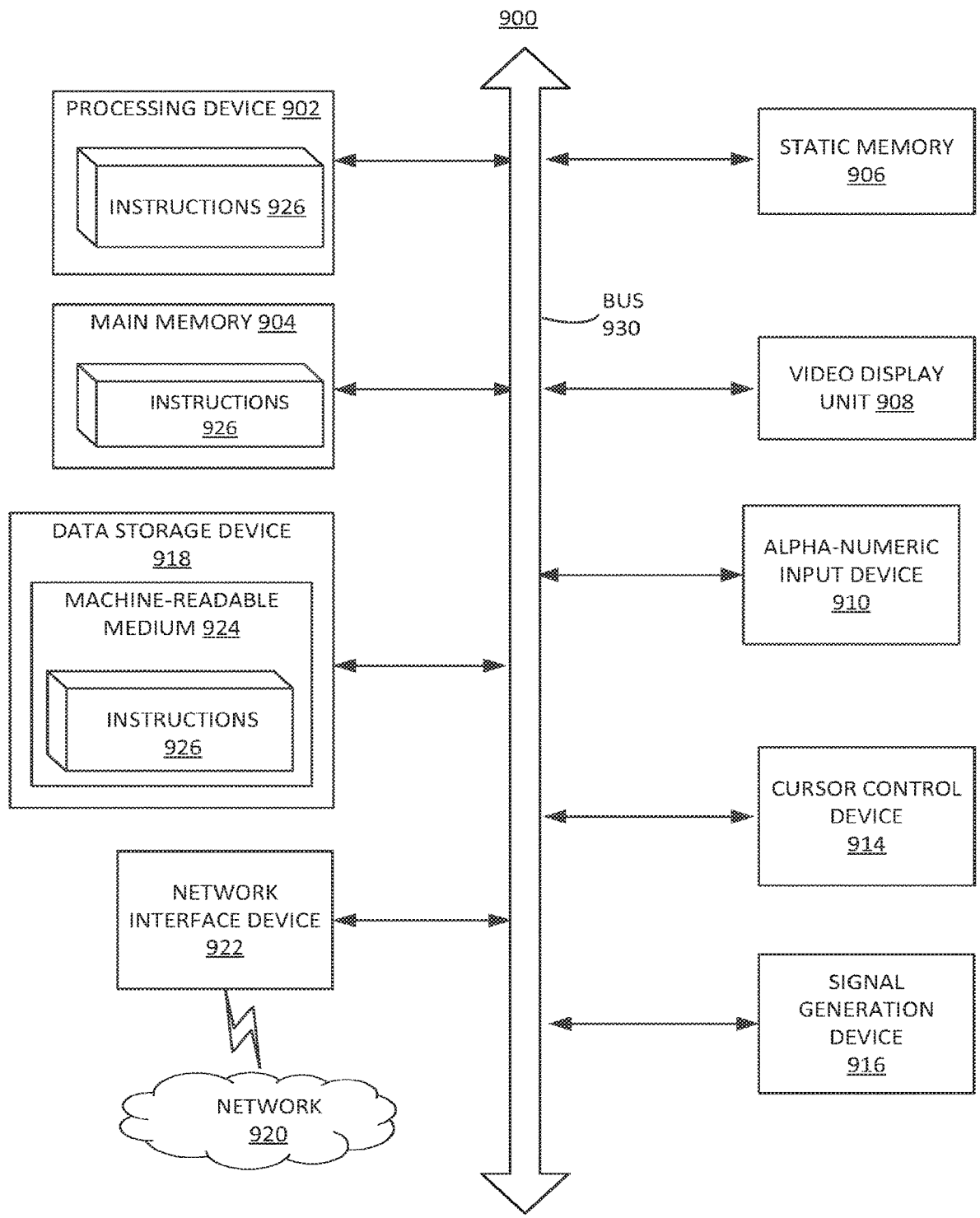
FIG. 9 illustrates another implementation of a block diagram for a computing system according to one implementation.

FIG. 9 illustrates a diagrammatic representation of a machine in the example form of a computing system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 900.

The computing system 900 includes a processing device 902, main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 930.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. In one embodiment, processing device 902 may include one or processor cores. The processing device 902 is configured to execute the processing logic 926 for performing the operations discussed herein. In one embodiment, processing device 902 can be part of a computing system. Alternatively, the computing system 900 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 900 may further include a network interface device 908 communicably coupled to a network 920. The computing system 900 also may include a video display unit 910 (e.g., a liquid crystal display (LCD) or a cathode ray tube (CRT)), an alphanumeric input device 910 (e.g., a keyboard), a cursor control device 914 (e.g., a mouse), a signal generation device 916 (e.g., a speaker), or other peripheral devices. Furthermore, computing system 900 may include a graphics processing unit 922, a video processing unit 928 and an audio processing unit 932. In another embodiment, the computing system 900 may include a chipset (not illustrated), which refers to a group of integrated circuits, or chips, that are designed to work with the processing device 902 and controls communications between the processing device 902 and external devices. For example, the chipset may be a set of chips on a motherboard that links the processing device 902 to very high-speed devices, such as main memory 904 and graphic controllers, as well as linking the processing device 902 to lower-speed peripheral buses of peripherals, such as USB, PCI or ISA buses.

The data storage device 918 may include a computer-readable storage medium 924 on which is stored software 926 embodying any one or more of the methodologies of functions described herein. The software 926 may also reside, completely or at least partially, within the main memory 904 as instructions 926 and/or within the processing device 902 as processing logic 926 during execution thereof by the computing system 900; the main memory 904 and the processing device 902 also constituting computer-readable storage media.

The computer-readable storage medium 924 may also be used to store instructions 926 utilizing the processing device 902, such as described with respect to FIG. 1, and/or a software library containing methods that call the above applications. While the computer-readable storage medium 924 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is a processing device, including: 1) a register to store data; and 2) a processor core coupled to the register, wherein the processor core is to: a) generate a first bitmap comprising: i) a first bit located at a first position in the first bitmap, wherein the first bit represents a first memory location in a memory device; and ii) a second bit located at a second position in the first bitmap, wherein: the second bit represents a second memory location in the memory device, and the first position and the second position of the first bitmap are in sequential order; b) determine that a value of the second bit is equal to a value of the first bit in the first bitmap; c) generate a second bitmap comprising a third bit representing the location of the first bit in the first bitmap; d) determine that the second bit is a last bit in the first bitmap with the same value as the first bit; e) generate a third bitmap comprising a fourth bit indicating that the second bit is the last bit in the first bitmap with the same value as the first bit; and f) write data associated with the second bit to the second memory location.

In Example 2, the processing device of Example 1, wherein the first bitmap comprises a fifth bit located at a third position in the first bitmap, wherein the fifth bit represents a third memory location.

In Example 3, the processing device of Example 2, wherein the processor core is further to: a) determine that the value of the fifth bit is not equal to a value of the second bit; and b) write data associated with the fifth bit to the second memory location.

In Example 4, the processing device of Example 2, wherein the processor core is further to: a) determine that a value of the fifth bit is equal to the value of the second bit; b) generate a second bitmap comprising the third bit representing the location of the first bit and the fifth bit in the first bitmap; c) determine that the second bit is the last bit in the first bitmap with the same value as the first bit and the fifth bit; and d) generate a third bitmap comprising the fourth bit indicating that the second bit is the last bit in the first bitmap with the same value as the first bit and the fifth bit.

In Example 5, the processing device of Example 1, wherein the first bitmap includes: i) a fifth bit located at a third position in the first bitmap, wherein the fifth bit represents a third memory location; and ii) a sixth bit located at a fourth position in the first bitmap, wherein the sixth bit represents a fourth memory location.

In Example 6, the processing device of Example 5, wherein the processor core is further to: a) determine that a value of the fifth bit is equal to a value of the sixth bit in the first bitmap; b) generate the second bitmap comprising a seventh bit representing the location of the sixth bit in the first bitmap; c) determine that the sixth bit is a last bit in the first bitmap with the same value as the fifth bit; d) generate the third bitmap comprising an eighth bit indicating that the sixth bit is the last bit in the first bitmap with the same value as the fifth bit; and e) write data associated with the sixth bit to the fourth memory location.

In Example 7, the processing device of Example 1, wherein the first bitmap includes: i) a fifth bit located at a third position in the first bitmap, wherein the fifth bit represents a third memory location; ii) a sixth bit located at a fourth position in the first bitmap, wherein the sixth bit represents a fourth memory location; and iii) a seventh bit located at a fifth position in the first bitmap, wherein the seventh bit represents a fifth memory location.

In Example 8, the processing device of Example 7, wherein the processor core is further to: a) determine that a value of the fifth bit is equal to a value of the sixth bit in the first bitmap; b) determine that the value of the seventh bit is not equal to any of the bits in the first bitmap; c) generate the second bitmap comprising an eighth bit representing the location of the sixth bit in the first bitmap; d) determine that the sixth bit is a last bit in the first bitmap with the same value as the sixth bit; e) generate the third bitmap comprising: i) an eighth bit indicating that the sixth bit is the last bit in the first bitmap with the same value as the fifth bit; and ii) a ninth bit indicating that no other bits in in the first bitmap are equal seventh bit; f) write data associated with the sixth bit to the fourth memory location; and g) write data associated with the seventh bit to the fifth memory location.

In Example 9, the processing device of Example 7, wherein the processor core is further to: a) determine that a value of the fifth bit is equal to a value of the seventh bit in the first bitmap; b) determine that a value of the sixth is equal to the value of the seventh bit in the first bitmap; c) generate the second bitmap comprising an eighth bit representing the location of the fifth bit and the sixth bit in the first bitmap; d) determine that the seventh bit is the last bit in the first bitmap with the same value as the fifth bit and the sixth bit; e) generate the third bitmap comprising: i) an ninth bit indicating that the seventh bit is the last bit in the first bitmap with the same value as the fifth bit; and ii) write the data associated with the seventh bit to the fifth memory location.

In Example 10, the processing device of Example 1, wherein each bit of the first bitmap has a position that is in sequential order.

Various embodiments may have different combinations of the structural features described above. For instance, all optional features of the processors and methods described above may also be implemented with respect to a system described herein and specifics in the examples may be used anywhere in one or more embodiments.

Example 11 is a processing device including: 1) a processor core; and 2) a memory device coupled to the processor core, wherein the processor core is to: a) generate a first bitmap comprising a plurality of bits, wherein the plurality of bits comprise a first bit that represents a first memory location, and b) determine that a value of the first bit is equal to a value of a second bit in the first bitmap; c) determine the location of the second bit in relation to the first bit in the first bitmap; and d) generate a second bitmap comprising a third bit indicating that the first bit is a last bit in the first bitmap with the same value as the second bit.

In Example 12, the processing device of Example 11, wherein the processor is further to write data associated with the first bit to the first memory location.

In Example 13, the processing device of Example 11, wherein the first bitmap comprises a fifth bit located at a third position in the first bitmap, wherein the fifth bit represents a third memory location.

In Example 14, the processing device of Example 13, wherein the processor core is further to: a) determine that a value of the fifth bit is not equal to a value of the first bit or the second bit; b) write data associated with the first bit to the first memory location; and c) write data associated with the fifth bit to the third memory location.

In Example 15, the processing device of Example 13, wherein: i) each bit of the plurality of bits has a position in the first bitmap, and ii) the positions of each bit are in sequential order.

Various embodiments may have different combinations of the structural features described above. For instance, all optional features of the processors and methods described above may also be implemented with respect to a system described herein and specifics in the examples may be used anywhere in one or more embodiments.

Example 16 is a method including: 1) generating a first bitmap comprising a plurality of bits, the plurality of bits comprising a first bit located at a first position in the first bitmap, wherein the first bit represents a first memory location; 2) determining that a value of the first bit is equal to a value of a second bit in the first bitmap precedes the first position; and 3) generating a second bitmap comprising a third bit indicating that the first bit is a last bit in the first bitmap with the same value as the second bit.

In Example 17, the method of Example 16, further including writing data associated with the first bit to the first memory location.

In Example 18, the method of Example 16, further including generating a third bitmap comprising a fourth bit representing the location of the second bit in relation to the first bit in the first bitmap.

In Example 19, the method of claim 16, wherein: i) each bit of the plurality of bits has a position in the first bitmap, and ii) the positions of each bit are in sequential order.

In Example 20, the method of claim 16, wherein the determining that a value of the first bit is equal to a value of a second bit further includes comparing the value of the first bit to the value of the second bit.

While the present invention has been described with respect to a limited number of embodiments, those skilled in the art will appreciate numerous modifications and variations therefrom. It is intended that the appended claims cover all such modifications and variations as fall within the true spirit and scope of this present invention.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system have not been described in detail in order to avoid unnecessarily obscuring the present invention.

The embodiments are described with reference to dynamic cache hash changes between SNCs in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present invention can be applied to other types of circuits or semiconductor devices that can benefit from higher pipeline throughput and improved performance. The teachings of embodiments of the present invention are applicable to any processor or machine that performs data manipulations. However, the present invention is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present invention rather than to provide an exhaustive list of all possible implementations of embodiments of the present invention.

Although the below examples describe instruction handling and distribution in the context of execution units and logic circuits, other embodiments of the present invention can be accomplished by way of a data or instructions stored on a machine-readable, tangible medium, which when performed by a machine cause the machine to perform functions consistent with at least one embodiment of the invention. In one embodiment, functions associated with embodiments of the present invention are embodied in machine-executable instructions. The instructions can be used to cause a general-purpose or special-purpose processor that is programmed with the instructions to perform the steps of the present invention. Embodiments of the present invention may be provided as a computer program product or software which may include a machine or computer-readable medium having stored thereon instructions which may be used to program a computer (or other electronic devices) to perform one or more operations according to embodiments of the present invention. Alternatively, operations of embodiments of the present invention might be performed by specific hardware components that contain fixed-function logic for performing the operations, or by any combination of programmed computer components and fixed-function hardware components.

Instructions used to program logic to perform embodiments of the invention can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element.

A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:

a source register to store a first vector with each element identifying a memory location in a memory device, wherein the first vector comprises a first element located at a first position in the first vector, the first element storing a first value identifying a first memory location in the memory device, and a second element located at a subsequent position in the first vector, the second element storing a second value identifying a second memory location in the memory device;

a destination register to store a second vector;

a decoder to decode a single instruction multiple data (SIMD) instruction to generate a mask for a scatter operation to avoid lane conflicts during the scatter operation; and an execution unit coupled to the destination register and the source register, the execution unit to:

store, in the destination register, the second vector with each element containing a range of bits corresponding to comparisons of a current element in the first vector with each of the preceding elements in the first vector, wherein each bit in the range of bits is set when the corresponding comparison results in a conflict;

identify, using the second vector, that the second element is a last element in the first vector with the same value as the first element; and generate a third vector with each element identifying a mask bit, wherein the mask bit is set when 1) the corresponding element in the first vector is not in conflict with other elements in the first vector or 2) the corresponding element is in conflict with one or more other elements in the first vector and is a last element in a sequential order of the first vector that conflicts with the one or more other elements, wherein a position of each element in the third vector maps to a same position of the corresponding element in the first vector, wherein the third vector is the mask for the scatter operation.

2. The processor of claim 1, wherein the second element is located at a second position in the first vector, wherein the first vector comprises a third element located at a third position in the first vector, wherein the third element stores a third value identifying a third memory location in the memory device, wherein the third value is not equal to the second value of the second element, and wherein the third vector comprises a first mask bit corresponding to the first element that is not set, a second mask corresponding to the second element that is set, and a third mask corresponding to the third element that is set.

3. The processor of claim 1, wherein the second element is located at a second position in the first vector, wherein the first vector comprises a third element located at a third position in the first vector, wherein the third element stores a third value identifying a third memory location in the memory device, wherein the third value is equal to the second value of the second element, and wherein the third vector comprises a first mask bit corresponding to the first element that is not set, a second mask corresponding to the second element that is not set, and a third mask corresponding to the third element that is set.

4. The processor of claim 1, wherein the first vector comprises:

a third element located at a third position in the first vector, wherein the third element represents a third memory location; and a fourth element located at a fourth position in the first vector, wherein the fourth element represents a fourth memory location.

5. The processor of claim 4, wherein the execution unit is further to:

determine that a value of the third element is equal to a value of the fourth element in the first vector; and determine that the fourth element is a last bit in the first vector with the same value as the third element, wherein the third vector comprises a third mask corresponding to the third element that is not set and a fourth mask corresponding to the fourth element that is set.

6. The processor of claim 1, wherein the first vector comprises:
- a third element located at a third position in the first vector, wherein the third element represents a third memory location;
- a fourth element located at a fourth position in the first vector, wherein the fourth element represents a fourth memory location; and
- a fifth element located at a fifth position in the first vector, wherein the fifth element represents a fifth memory location.

7. The processor of claim 6, wherein the execution unit is further to:
- determine that a value of the third element is equal to a value of the fourth element in the first vector;
- determine that the value of the fifth element is not equal to a value of any of the elements in the first vector; and
- determine that the fourth element is a last bit in the first vector with the same value as the third element, wherein the third vector comprises a third mask corresponding to the third element that is not set, a fourth mask corresponding to the fourth element that is set, and a fifth mask corresponding to the fifth element that is set.

8. The processor of claim 6, wherein the execution unit is further to:
- determine that a value of the third element is equal to a value of the fifth element in the first vector;
- determine that a value of the fourth element is equal to the value of the fifth element in the first vector; and
- determine that the fifth element is the last bit in the first vector with the same value as the third element and the fourth element, wherein the third vector comprises a third mask corresponding to the third element that is not set, a fourth mask corresponding to the fourth element that is not set, and a fifth mask corresponding to the fifth element that is set.

9. The processor of claim 1, wherein each element of the first vector has a position that is in sequential order.

10. A processing device comprising:
- a register to store data; and
- a processor core coupled to the register, wherein the processor core is to:
  - store a first bitmap comprising a first bit located at a first position in the first bitmap and a second bit located at a second position in the first bitmap;
  - generate a second bitmap comprising a third bit representing a location of the first bit in the first bitmap;
  - generate a third bitmap comprising a fourth bit indicating that the second bit is a last bit in the first bitmap with the same value as the first bit; and
  - write data associated with the second bit to a second memory location identified by the second bit, wherein the first bitmap further comprises a fifth bit located at a third position in the first bitmap;
  - determine that the value of the fifth bit is not equal to a value of the second bit; and
  - write data associated with the fifth bit to the second memory location.

11. A system comprising:
- a processor; and
- a memory device coupled to the processor, wherein the processor is to:
  - store a first bitmap;
  - generate a second bitmap comprising cells, each cell in the second bitmap identifying a mask bit, wherein the mask bit is set when 1) a corresponding cell in a first bitmap is not in conflict with other elements in the first bitmap or 2) a corresponding cell is in conflict with one or more other cells in the first bitmap and is a last cell in a sequential order of the first bitmap that conflicts with the one or more other cells, wherein a position of each cell in the second bitmap maps to a same position of the corresponding cell in the first bitmap; and
  - store the second bitmap as a mask for a scatter operation to avoid lane conflicts
  - determine that a value of a first cell of the first bitmap is equal to a value of a second cell in a first bitmap;
  - determine that a value of a third cell of the first bitmap is not equal to a value of any other cell in the first bitmap;
  - determine that the first cell is a last cell in a sequential order of the first bitmap with the same value as the second cell; and
  - generate a third bitmap comprising:
    - a first cell, corresponding to the first cell in the first bitmap, that indicates that the first cell is a last cell in the first bitmap with the same value as the second cell; and
    - a third cell, corresponding to the third cell in the first bitmap, that indicates that the value of the third cell is not equal to the value of any other cell in the first bitmap.

12. The system of claim 11, wherein the processor is further to write data associated with the first cell to a first memory location identified by the first cell of the first bitmap.

13. The system of claim 11, wherein the processor is further to:
- determine that a value of a fourth cell of the first bitmap is not equal to the value of the first cell or the value of the second cell, wherein the third bitmap comprises a fourth cell, corresponding to the fourth cell of the first bitmap, that indicates that the value of the fourth cell is not equal to the value of any of the other cells of the first bitmap;
- write data associated with the first cell to a first memory location identified by the first cell of the first bitmap; and
- write data associated with the third cell to a third memory location identified by the third cell of the first bitmap.

14. The system of claim 11, wherein positions of each cell of the first bitmap are in sequential order.

15. A method comprising:
- storing a first bitmap;
- generating a second bitmap comprising cells, each cell in the second bitmap identifying a mask bit, wherein the mask bit is set when 1) a corresponding cell in a first bitmap is not in conflict with other elements in the first bitmap or 2) a corresponding cell is in conflict with one or more other cells in the first bitmap and is a last cell in a sequential order of the first bitmap that conflicts with the one or more other cells, wherein a position of each cell in the second bitmap maps to a same position of the corresponding cell in the first bitmap; and
- storing the second bitmap as a mask for a scatter operation to avoid lane conflicts;
- determining that a value of a first cell of the first bitmap is equal to a value of a second cell in a first bitmap;
- determining that a value of a third cell of the first bitmap is not equal to a value of any other cell in the first bitmap;

determining that the first cell is a last cell in a sequential order of the first bitmap with the same value as the second cell; and generating a third bitmap comprising:
- a first cell, corresponding to the first cell in the first bitmap, that indicates that the first cell is a last cell in the first bitmap with the same value as the second cell; and
- a third cell, corresponding to the third cell in the first bitmap, that indicates that the value of the third cell is not equal to the value of any other cell in the first bitmap.

16. The method of claim 15, further comprising:

determining that a value of a fourth cell of the first bitmap is not equal to the value of the first cell or the value of the second cell, wherein the third bitmap comprises a fourth cell, corresponding to the fourth cell of the first bitmap, that indicates that the value of the fourth cell is not equal to the value of any of the other cells of the first bitmap;

writing data associated with the first cell to a first memory location identified by the first cell of the first bitmap; and writing data associated with the third cell to a third memory location identified by the third cell of the first bitmap.

17. The method of claim 15, comprising generating a third bitmap comprising a cell representing a location of the second cell in relation to the first cell in the first bitmap.

18. The method of claim 15, wherein the determining that the value of the first cell is equal to the value of the second cell further comprises comparing the value of the first cell to the value of the second cell.

\* \* \* \* \*